(12) United States Patent
Vliet

(10) Patent No.: US 10,957,219 B2
(45) Date of Patent: Mar. 23, 2021

(54) BLOCKS ASSEMBLY

(71) Applicant: John Vliet, Fairhaven, MA (US)

(72) Inventor: John Vliet, Fairhaven, MA (US)

(*) Notice: Subject to any disclaimer, the term of this patent is extended or adjusted under 35 U.S.C. 154(b) by 528 days.

(21) Appl. No.: 15/830,985

(22) Filed: Dec. 4, 2017

(65) Prior Publication Data

US 2019/0172369 A1 Jun. 6, 2019

(51) Int. Cl.
*G09B 19/02* (2006.01)
*G09B 1/14* (2006.01)

(52) U.S. Cl.
CPC ............... *G09B 19/02* (2013.01); *G09B 1/14* (2013.01)

(58) Field of Classification Search
CPC .................................. G09B 19/02; G09B 1/14
USPC ........................................................ 434/203
See application file for complete search history.

(56) References Cited

U.S. PATENT DOCUMENTS

| 196,532 | A | * | 10/1877 | Martin | G09B 17/00 |
| | | | | | 434/172 |
| 1,471,437 | A | | 10/1923 | Wood | |
| 2,899,757 | A | | 8/1959 | Webb | |
| 4,518,359 | A | | 5/1985 | Yao-Psong | |
| 4,560,354 | A | | 12/1985 | Fowler | |
| 5,149,269 | A | * | 9/1992 | Ylitalo | G06C 1/00 |
| | | | | | 434/203 |
| 5,421,732 | A | | 6/1995 | Taylor | |
| 6,884,077 | B2 | | 4/2005 | Faulkner | |
| 7,309,233 | B2 | | 12/2007 | Nguyen | |
| 7,695,283 | B2 | | 4/2010 | Buhrman | |
| 2008/0268407 | A1 | | 10/2008 | Brett | |
| 2014/0272829 | A1 | | 9/2014 | Skaggs | |

FOREIGN PATENT DOCUMENTS

| CN | 2612007 Y | | 4/2004 |
| DE | 202005008012 U1 | | 8/2005 |
| JP | 2006141417 A | * | 6/2006 |
| JP | 2009216908 A | * | 9/2009 |
| WO | 2011120106 A1 | | 10/2011 |

OTHER PUBLICATIONS

Add & Subtract Abacus—Melissa & Doug, http://www.mellssaanddoug.com/add-and-subtract-abacus/9272.html?cgid=our-toys-developmental-toys-numbers-and-counting, retrieved Nov. 7, 2017.

* cited by examiner

*Primary Examiner* — James B Hull
*Assistant Examiner* — Jennifer L Korb
(74) *Attorney, Agent, or Firm* — Lambert Shorten & Connaughton; Gary E. Lambert; David J. Connaughton, Jr.

(57) ABSTRACT

A blocks assembly is provided. The assembly is formed of a base with an arch attached thereto. A number of blocks are slideably attached to the arch and confined by the base. The blocks can be slid from one side of the arch to the other. Markings on each side of the arch indicate how many blocks are on each side of the arch. Addition, subtraction, and general mathematical principles and relationships can be taught by movement and manipulation of the blocks.

20 Claims, 4 Drawing Sheets

BLOCKS ASSEMBLY

BACKGROUND OF THE INVENTION

Field of the Invention

The present invention relates generally to a block assembly. More particularly the present invention relates to a math blocks assembly having blocks movable about an arch to aid in development of math skills.

Description of Related Art

Development of basic mathematical skills and understanding fundamental mathematical principles are important building blocks to math and science education. Often, numbered blocks are used to expose numbers to a learner in a fun way. However, the numbered blocks do not represent any relational connection to the number. Physical relationships of numbers, and the relationship of units to mathematical operations are not effectively taught using simple toy structures for early learning.

Therefore, what is needed is a device that may aid in the teaching of mathematical relationships and principles to an early stage learner in a fun and productive manner.

SUMMARY OF THE INVENTION

The subject matter of this application may involve, in some cases, interrelated products, alternative solutions to a particular problem, and/or a plurality of different uses of a single system or article.

In one aspect, a blocks assembly is provided. The assembly has a base, with an arch attached to the base. The arch is formed of two legs and a connector joining the two legs. Distal ends of the legs are connected to the base, while the connector joins two proximal ends of arch legs. On each leg are a plurality of numerical markings arranged along a height of the legs in a progressive order starting from the base and increasing in number as the markings approach the connector. A plurality of blocks are connected to the arch with the arch passing through an aperture of each block. These blocks are slideable along the arch to move from one leg across the connector to the other leg. In this aspect, the total number of numerical markings is equal to one greater than the plurality of blocks. The plurality of numerical markings starts at zero and counts up on each leg to a number which is equal to the number of blocks. For example, with ten blocks, there will be eleven markings, 0-10. Each of these numerical markings is spaced apart height wise along each leg from the previous numerical marking by a distance that is equal to a height of one of the plurality of blocks.

In another aspect, a blocks assembly is provided. The assembly has a base, with a sliding track having two legs and a connector joining the two legs. Distal ends of the legs are connected to the base, while the connector joins two proximal ends of sliding track legs. A plurality of blocks are slideably connected to the sliding track. On each leg are eleven numerical markings arranged along a height of the legs in a progressive order starting at zero from the base and increasing in number to ten as the markings approach the connector. Each of these numerical markings is spaced apart height wise along each leg from the previous numerical marking by a distance that is equal to a height of one of the plurality of blocks.

DETAILED DESCRIPTION

Figure 1:
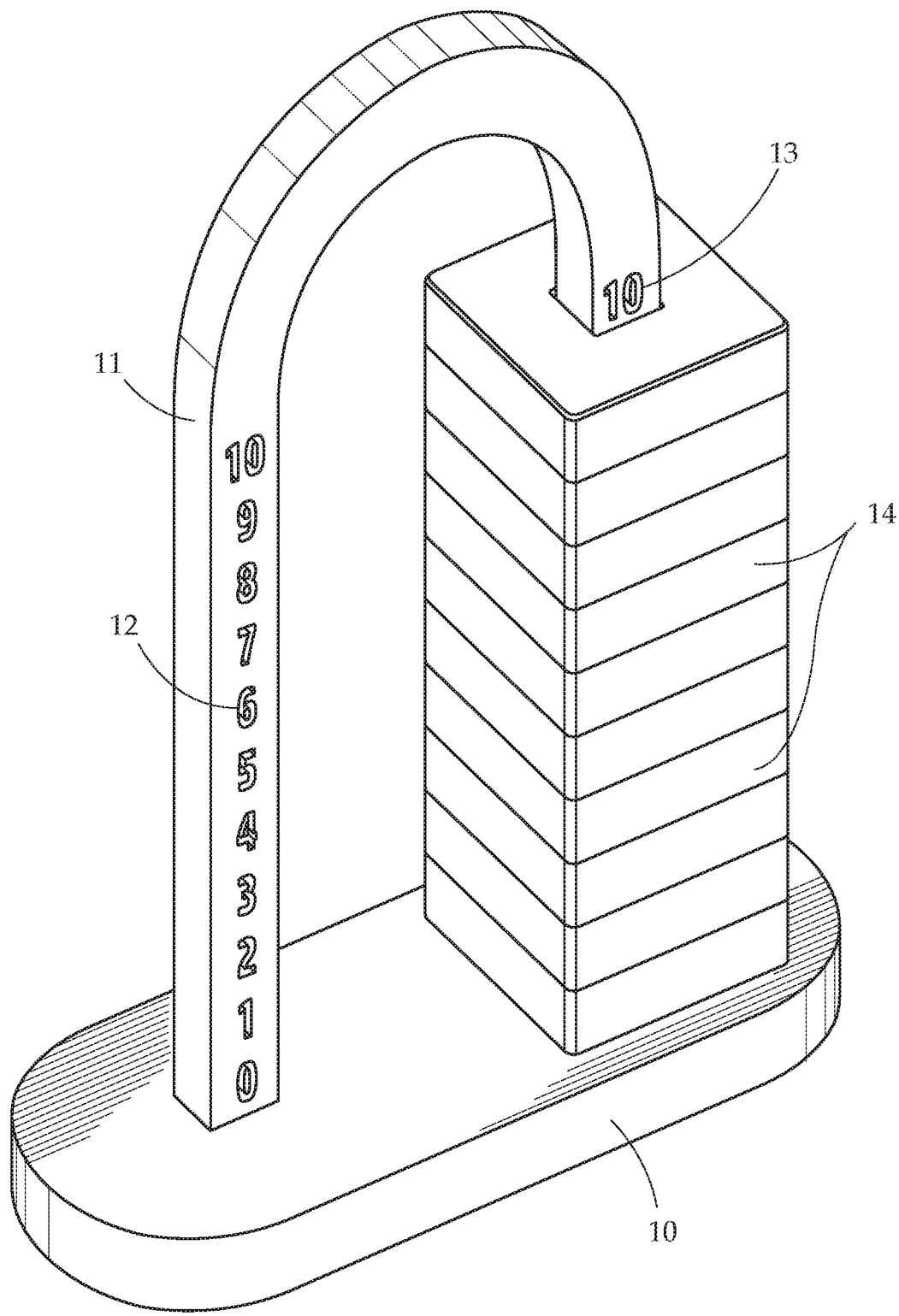
FIG. 1 provides a perspective view of an embodiment of the present invention.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a blocks device having a base, and an arch attached to the base. The arch has numerical markings along its height. Blocks, usually ten of them, are attached to the arch. These blocks are slidable from one side of the arch to the other. The numerical markings correspond to a total number of blocks that may be on each side of the arch.

The components of the present invention may be formed of any material capable of being manipulated to support the block and arch structure that can allow a movement of the blocks from one side of the arch to the other. Non-limiting examples of which the device may be made include, but are not limited to wood, plastic, metal, composite materials, and the like.

The device of the present invention may have a base, with an arch or other sliding track of similar shape attached. Two elongate legs extend away from the base and are joined by the arch or other connecting shape. The arch may be any structure and shape to act as a sliding track along which the blocks may slide. In one embodiment, the blocks may be held onto the device by having an opening defined through their bodies, with the arch passing through this opening. The term "arch" is used throughout this disclosure, however any other block and sliding track connections or configurations may be used without straying from the scope of the present invention.

The blocks may be any size and shape capable of being attached to the device and movable from one side to the other side. While the blocks of the present invention are shown having an approximately rectangular cross sectional perimeter, they may be of any shape and configuration. Further, in some embodiments, the blocks may be of different colors from each other. For example, the blocks may be the same color, two alternating colors, three or more colors in alternating or varied order, and the like. In most embodiments, the blocks will not have any markings, numerical or otherwise. The lack of numerical or other markings on the blocks may be important in many embodiments because they are intended to merely represent a single unit. Typically, the blocks are fixed to the device and can only be removed by removal of the arch from the base.

In one embodiment, the color of the blocks may play an important role to reinforce the fact that there is nothing inherent about individual objects that dictates their position in space. For example, if there are five blocks on each side of the arch, with one top block being green and the other top block orange, it can be shown that the color of the block does not correspond to its number. Accordingly, differently colored blocks may be used in the present invention.

In many embodiments, the blocks are the same size. That may be useful to highlight that it is the physical movement (addition or subtraction) of the equal size blocks that corresponds to the changing numeric symbols fixed in place along the arch legs. It is the legs of the arch which have markings that are fixed in positions. These numbers never move, but are fixed in space. This marking scheme is intentional to represent the linear number system. Three always comes before four and four always comes before five.

In the present invention, any block could be in the fourth position, and it is the block's position in space that gives the value of four. This value does not depend on the block's color, marking, texture, etc. Put another way, the present invention requires that blocks must be moved to a point in space along one of the legs of the arch to have a particular value. This value may change when a block is moved from one side of the arch to the other. This teaches that a cause and effect relationship exists between addition and subtraction both physically and visually. Because any block removed from one side is added to the other side, this relationship can be very clearly shown. As configured, the present invention can be used to demonstrate a clear relationship about position, size, proportion, and other mathematical relationships.

In most embodiments, the blocks will be permanently attached to the device, creating a constrained area of movement from one side of the arch to the other. This may be an effective way to teach that with every kinetic movement of the block, there is a constrained and guided axiomatic relationship. The present invention can thus teach the most elementary relationships between numeric symbols and positions in space. For example ten of the individual blocks on one side of the arch results in a block being below the number '10' marked on the arch leg. Therefore, ten individual units equals ten. The point is reinforced that numeric value is not inherent in the objects themselves.

Figure 2:
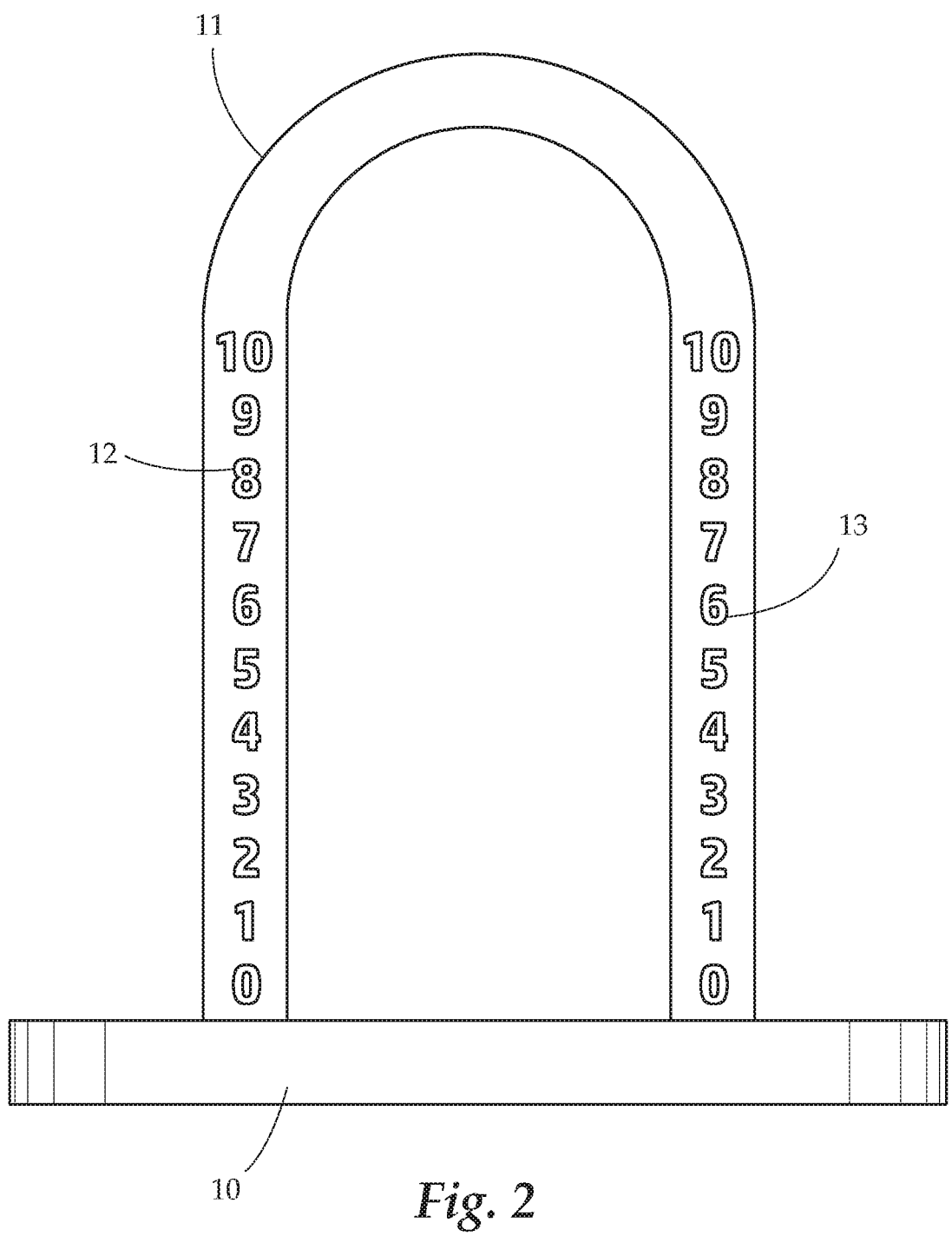
FIG. 2 provides a front view of an embodiment of the base and arc of the present invention.
Figures 3, 4:
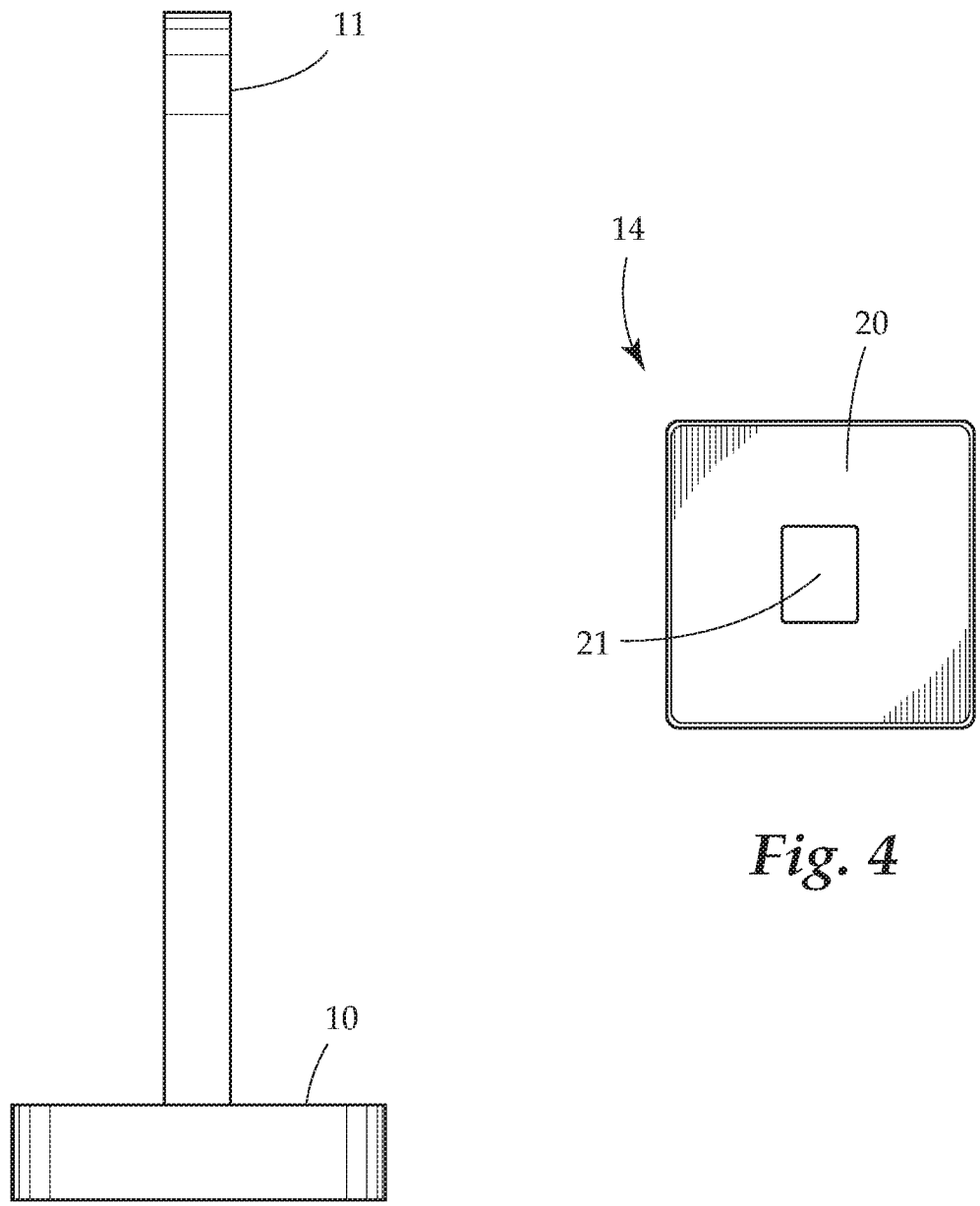
FIG. 3 provides a side view of an embodiment of the base and arc of the present invention.
FIG. 4 provides a view of a block of the present invention.

Turning now to FIGS. 1-3, a perspective view of the inventive device is shown. The device has a base 10 which supports and provides structure for the device. An arch 11 is connected to the base 10 at the distal ends of each leg of the arch 11. A rounded connector joins the proximal ends of the legs. A plurality of markings 12, 13 are positioned on each arch leg. In this embodiment, there are eleven markings 12, 13 on each leg formed as sequential numbered markings starting at zero by the base and increasing height wise along the leg. In one embodiment, the markings may be on a front and back of each leg. In another embodiment, the markings may be on a front of each leg only. In yet another embodiment, the markings may be on each side of each leg. The markings of this embodiment are numbered 0-10.

Ten blocks 14 are connected to the arch 11 by an aperture formed through their heights. The blocks 14 are slideable from one side of the arch 11 to the other, and use gravity to sit at a bottom of each leg. The base 10 is a continuous surface and forms a closed loop over the area that the blocks 14 may move, in that they are limited in movement between one end of the arch and the other, to the extent that the other blocks or the base 10 prevents their movement. The blocks 14 and markings 12, 13, are sized such that each block covers a number, and shows the number of blocks on the leg side of the arch 11 immediately above the top most block 14 (or base if there are no blocks). This results in each marking being spaced from the adjacent markings by a distance equal to a height of one of the blocks. For example, in the arrangement shown in FIG. 1, there are ten blocks on the right side of the arch 11, and the "10" marking is shown above this tenth block. Similarly, on the left side of the arch 11, there are zero blocks, and this is shown because the zero is above the base 10.

Blocks 14 are shown herein being approximately square across a top cross section, and approximately rectangular across the widthwise and lengthwise cross sections. However, it should be understood that the blocks may be of any shape and configuration without straying from the scope of this invention. An aperture extends height wise through each block 14 and is larger than a cross section of the leg of the arch 11. Typically, the aperture is only slightly larger than the cross section of the leg, but this is not necessary, and may be quite a bit larger. In operation, the blocks are slideable along the arch to move from one side to the other. Preferably the blocks may be freely slideable, although in some embodiments a slight frictional force may be applied between the leg of the arch 11 and the interior face of the block 14. In the side view of FIG. 3, the blocks are not shown.

FIG. 4 shows an embodiment of a block from a top view. In this view, the block may be approximately square or rectangular, having a top 20 defining a height wise aperture 21 through which the leg of the arch 11 may pass. In such an embodiment having a rectangular arch leg, and a corresponding rectangular aperture 21 for the block 14, rotation of the block 14 is prevented. Preventing rotation is desirable in many embodiments to focus the user's attention on the numerical relationships. However, in an embodiment having rotational blocks, the aperture 21 may be circular or otherwise rounded, the leg of the arch 11 may be circular or otherwise rounded, or the aperture 21 may be sufficiently large to allow rotation of the block about the leg regardless of shape.

Figure 5:
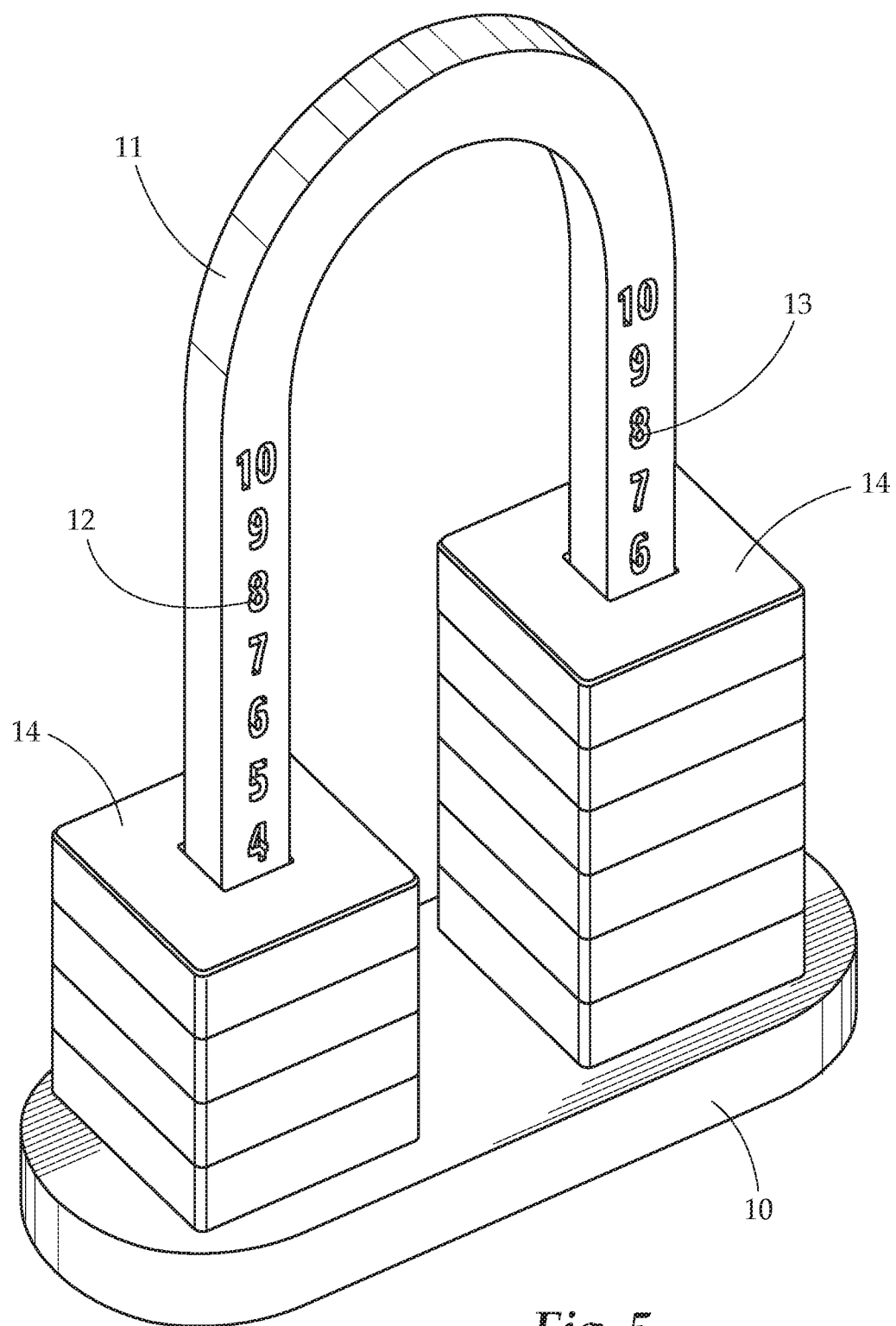
FIG. 5 provides a perspective view of an embodiment of the present invention.

FIG. 5 shows a perspective view of another embodiment of the device. In this configuration, there are four blocks 14 on the left side of the arch 11, which cover the markings 12 up to the number '4', indicating that there are four blocks 14 on this side. Because this embodiment has ten blocks total, there are of course six blocks 14 on the right side of the arch 11. These six blocks 14 cover up to the number '6' of markings 13. As noted above, the numerical markings 12 spacing is equal to a height of the blocks 14. It should be noted that the maximum number marked on both sides of the arch will be equal to the total number of blocks.

In use, a child or other user may move blocks about the track defined by the arch. This movement may be instructed or free. Upon moving a block or blocks from one side to the other, the user may learn a number of things. First, the user may see how many blocks are on one side or the other by looking at the number above the top block on each side of the arch. From there, the user may identify by how much a first side decreased and a second side increased. This teaches basic addition and subtraction skills, as well as highlighting the relationships of the blocks to their numbers, and the fixed linear number relationship. As will be understood, a number of other important relationships and mathematical principles may be understood at an intuitive level by repeated use and training by the present invention.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A blocks assembly consisting of:
   a base;
   an arch comprising two legs and a connector joining the legs at a proximal end of each of the two legs, each of the two legs being connected to the base at a distal end of the respective leg;
   a plurality of sequential numerical markings on each of the two legs, the numerical markings arranged in sequential order starting from the base and increasing in number as the numbering approaches the connector;
   a quantity of ten blocks, each block defining an aperture through a height, the arch passing through the aperture of each of the ten blocks, wherein each of the ten blocks is slideable along the arch between one leg and the other leg;
   wherein a quantity of the plurality of numerical markings is equal to one greater than the quantity of blocks, the plurality of numerical markings starting at zero and counting up to a number which is equal to the number of blocks, each of the plurality of numerical markings spaced apart from an adjacent one of the plurality of numerical markings by a distance that is equal to a height of one of the plurality of blocks.

2. The blocks assembly of claim 1 wherein the markings are arranged in sequential order from zero to ten.

3. The blocks assembly of claim 1 wherein the quantity of ten blocks comprises blocks of at least two colors.

4. The blocks assembly of claim 1 wherein each of the ten blocks comprises a rectangular top cross section, and wherein the aperture has a rectangular cross section.

5. The blocks assembly of claim 1 wherein each of the ten blocks has no markings on the outer faces of the block.

6. The blocks assembly of claim 1 wherein the base, arch, and blocks are formed of wood.

7. The blocks assembly of claim 1 wherein one or a plurality of blocks is movable from the first leg to the second leg to identify a result of addition or subtraction.

8. The blocks assembly of claim 1 wherein the blocks are permanently attached to the arch.

9. The blocks assembly of claim 1 wherein the marking above a quantity of blocks on one of the two legs is equal to the number of blocks on the leg.

10. The blocks assembly of claim 1 wherein the connector is curved.

11. A blocks assembly consisting of:
    a base;
    a sliding track comprising two legs and a connector joining the legs at a proximal end of each of the two legs, each of the two legs being connected to the base at a distal end of the respective leg;
    eleven sequential numerical markings positioned on each of the two legs, the numerical markings arranged in sequential order starting from zero at the base and increasing in number to ten as the numbering approaches the connector;
    ten blocks, each of the blocks slideably connected to the sliding track allowing movement of each of the blocks between one leg and the other leg;
    wherein each of the numerical markings is spaced apart from an adjacent numerical marking by a distance that is equal to a height of one of the ten blocks.

12. The blocks assembly of claim 11 wherein one of the ten blocks is a different color from another of the ten blocks.

13. The blocks assembly of claim 11 wherein each of the blocks comprises a rectangular top cross section, and wherein each block comprises an aperture having a rectangular cross section.

14. The blocks assembly of claim 13 wherein the sliding track is formed as an arch having an elongate surface which defines a rectangular cross section that is slightly smaller than the rectangular cross section of the aperture, such that the blocks may slide along the arch.

15. The blocks assembly of claim 11 wherein each of the blocks has no markings on outer faces.

16. The blocks assembly of claim 11 wherein the base, sliding track, and blocks are formed of wood.

17. The blocks assembly of claim 11 wherein one or more of the ten blocks is movable from the first leg to the second leg to identify a result of addition or subtraction.

18. The blocks assembly of claim 11 wherein the blocks are permanently attached to the sliding track.

19. The blocks assembly of claim 11 wherein one of the eleven markings above one of the ten blocks is equal to a number of the plurality of blocks on the leg.

20. The blocks assembly of claim 11 wherein the connector is curved.

* * * * *